United States Patent [19]

Patience

[11] 3,912,863

[45] Oct. 14, 1975

[54] TELEGRAPH TRANSMISSION APPARATUS

[75] Inventor: Brian Michael Patience, Eastbourne, England

[73] Assignee: International Standard Electric Corporation, New York, N.Y.

[22] Filed: May 6, 1974

[21] Appl. No.: 467,043

[30] Foreign Application Priority Data

June 14, 1973 United Kingdom............... 28289/73

[52] U.S. Cl........... 178/17.5; 178/26 R; 340/173 SP

[51] Int. Cl......................... G11c 17/00; H04l 13/08

[58] Field of Search..... 178/17.5, 70 R, 69 A, 69 N, 178/2 B, 26 R, 26 A; 340/173 SP, 173 AM, 174.1 H

[56] References Cited

UNITED STATES PATENTS 3,772,659 11/1973 DeVries......................... 340/173 SP

*Primary Examiner*—Thomas A. Robinson

*Attorney, Agent, or Firm*—John T. O'Halloran; Menotti J. Lombardi, Jr.; Alfred C. Hill

[57] ABSTRACT

Waveform generating arrangement in which transitions between mark and space elements in a telegraph signal cause a pulse width modulated representation of a minimal-interference waveform having a predetermined profile of transitions to be read from a read-only memory. This waveform is then applied to an isolating output circuit which contains smoothing means to demodulate the signal to obtain output transitions with the predetermined profile of transitions.

6 Claims, 2 Drawing Figures

TELEGRAPH TRANSMISSION APPARATUS

BACKGROUND OF THE INVENTION

This invention relates to waveform generating arrangements in telegraphic communication systems.

In order to transmit telegraphic signals with the minimum of interference, it has long been the practice, at least in the United Kingdom, to apply the telegraph signals generated by a telegraph machine, such as a teleprinter or a tape-reader, and which ideally have square-edged transitions between mark and space elements, to a special LC filter, which produces therefrom signals with transitions between mark and space elements which vary in such a manner as to cause little or no interference. This filter is, however, bulky and costly, and it is desirable to find other means smaller and cheaper of providing the output signal transitions which give minimal interference.

SUMMARY OF THE INVENTION

According to the present invention, there is provided a waveform generating arrangement in a telegraphic communication system for generating, in response to the application of square-wave transitions between mark and space input signals, transitions, between first and second output signal levels, with a predetermined profile of transitions which arrangement comprises a digital storage means containing one or more digital words and arranged to be read out serially by bit, the one or more digital words providing a pulse-width modulated pulse train representing the predetermined profile of transitions, access means for accessing the word or words in the store, enabling means activated by transitions between mark and space input signals to enable said access means so that the contents of the storage means may be read out serially and without interruption and switching means under control of the input signals to apply the serially-read contents of the storage means either directly or after inversion, depending on the direction of transition of the input signals, to an output circuit, in which the contents of the storage means form the pulse-width modulated train representing the predetermined profile of transitions, and in which the output circuit includes a smoothing circuit which effectively demodulates the pulse-width modulated train so that the output of the output circuit contains transitions with the predetermined profile of transitions.

BRIEF DESCRIPTION OF THE DRAWINGS

An embodiment of the invention is described below with reference to the accompanying drawings, of which.

DESCRIPTION OF THE PREFERRED EMBODIMENT

Figure 1:
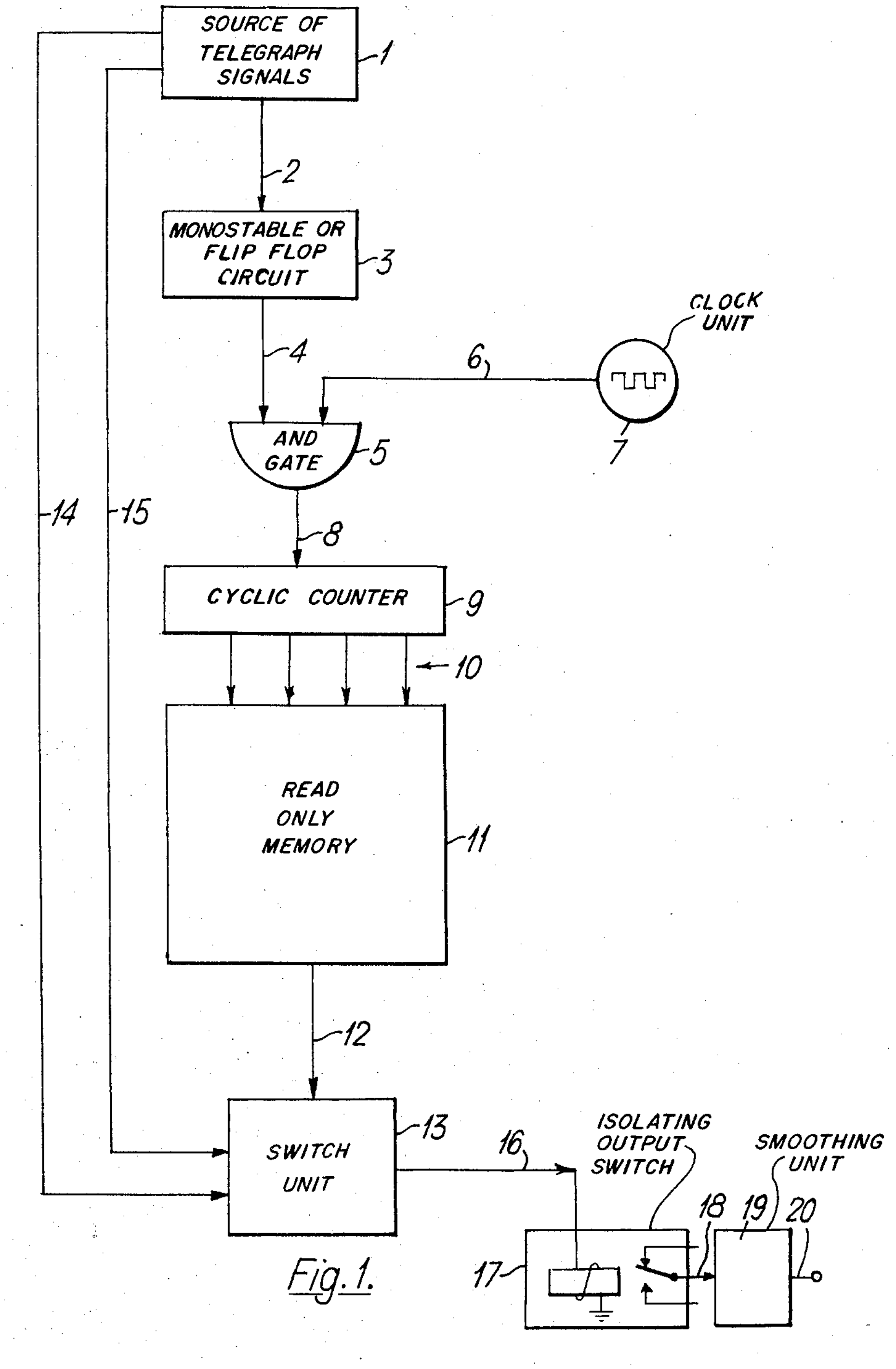
FIG. 1 is a block schematic diagram of the waveform generating circuit.
Figure 2:
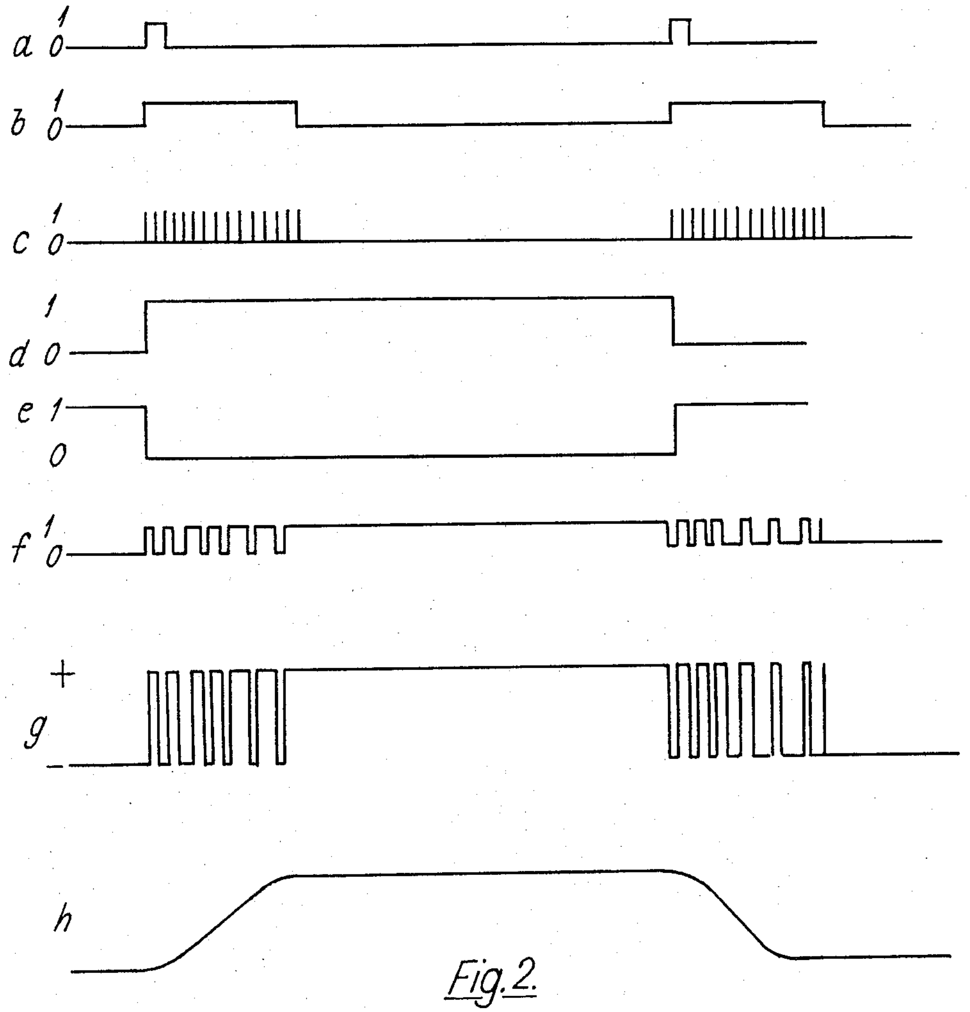
FIGS. 2*a* to *h* show signal waveshapes at various points in the circuit of FIG. 1.

A source of telegraph signals, 1, such as a teleprinter or a tape-reader, produces, at each transition between a mark element and a space element in a signal to be applied to an output line, a triggering signal (as at FIG. 2*a*) on a lead, 2, which triggers a flip-flop or monostable circuit, 3. The flip-flop 3, having been triggered remains in its unstable state for a predetermined time (as at FIG. 2*b*) during which, over a lead, 4, it enables one input of an AND-gate 5. A second input of the AND-gate 5 is repeatedly and regularly enabled over a lead, 6, by pulses from a clock unit, 7, so that during the aforesaid predetermined time the AND-gate is repeatedly enabled on both inputs and a stream of output signals (as at FIG. 2*c*) is derived from its output to drive, over a lead, 8, a cyclic counter, 9, through one complete cycle.

The counter 9, at each increment in its count, enables over a set of leads, 10, a different binary word to be read out serially-by-bit from a read-only memory (rom) 11. The repetition rate of clock 7 is such that the words are read out one after the other without interruption, and thus there appears a long train of bits on an output lead, 12, from the rom.

All of the words stored in rom 11 make up a pulse-width modulated representation of a minimal interference transition waveshape having a predetermined profile of transitions for the known type of input signals to be applied to the arrangement. The stored words are so constituted that the train of bits on lead 12 forms the pulse-width modulated representation of the minimal interference transition waveshape having the predetermined profile of transitions which it is desirable to apply to a telegraph transmission line.

The train of bits on lead 12 pass into a switch unit, 13, where, under control of leads, 14 and 15, from source 1, they are applied to an output line, 16, in either a direct or an inverted form. For example, if the train of bits, as stored, represents the desired predetermined minimal interference transition waveshape for a transition from a mark element to a space element, and lead 14 is activated (as in FIG. 2*d*) when source 1 produces a mark-to-space transition then switching unit 13, under control of lead 14 applies the signals on lead 12 directly to lead 16, whereas if lead 15 is activated by a space-to-mark transition (as at FIG. 2*e*) in source 1, the signals on lead 12 are passed through an inverter in unit 13 before being applied to lead 16.

The signals on lead 16 (as at FIG. 2*f*) are applied to an isolating output switch 17, here, for simplicity only represented as an electromagnetic relay. The signals on an output lead, 18, of the switch 17 pass through a smoothing unit 19, wherein the signals, still in bit train form (as at FIG. 2*g*) on lead 18, are transformed into the corresponding minimal interference transition waveshape having the predetermined profile of transitions (as at FIG. 2*h*) and applied to an output lead, 20.

Although we have shown the counter 9 driven by a pulse train through AND-gate 5 while the gate is held open by the flip-flop 3, this is not, as will be obvious to those skilled in the art, the only way in which a pulse train of predetermined length can be obtained. One obvious method is that the counter itself, having, with a first pulse from gate 5, gone "off-normal", to borrow a term from automatic telephony jargon, is able to maintain either gate 5 or an ancillary gate open for the passage of pulses from clock 7 until it returns to "normal" (completes its cycle).

The precise make up of the rom has not been detailed. Obviously, the rom must have a clock of its own which is much faster than clock 7 since, between each pulse from clock 7 which reaches the counter 9 through gate 5, a word in the store is read out serially-by-bit. The rom may contain, at one extreme, a large number of words each containing a small number of bits, or, at the other extreme, a small number of words each containing a large number of bits. The constitution of the rom and of the counter, which must have at least as many count states as there are words in the rom, are dependent on considerations of economical manufacture.

The smoothing unit is, of course, a form of filter but it is much simpler, smaller, and less costly than the special LC filters now used.

While I have described above the principles of my invention in connection with specific apparatus, it is to be clearly understood that this description is made only by way of example and not as a limitation to the scope of my invention as set forth in the objects thereof and in the accompanying claims.

I claim:

1. A waveform generating arrrangement in a telegraphic communication system for generating, in response to the application of square-wave transitions between mark and space input signals, transitions, between first and second output signal levels, with a predetermined profile of transitions which arrangement comprises:

a digital storage means containing one or more digital words and arranged to be read out serially-by-bit, said one or more digital words providing a pulse-width modulated pulse train representing said predetermined profile of transitions;

access means coupled to said storage means for accessing the word or words in said storage means;

enabling means coupled to said access means, said enabling means being activated by transitions between mark and space conditions of telegraphic input signals to enable said access means so that the contents of said storage means may be read out serially and without interruption; and switching means coupled to said storage means, said switching means being under control of said input signals to apply the serially-read contents of said storage means either directly or after inversion, depending on the direction of transition of said input signals, to an output circuit, in which the contents of said storage means form said pulse-width modulated pulse train representing said predetermined profile of transitions, and in which the output circuit includes a smoothing circuit which effectively demodulates said pulse-width modulated pulse train so that the output of said output circuit contains transitions with said predetermined profile.

2. An arrangement as claimed in claim 1 in which the access means is a cyclic counter which at each count step in its cycle accesses a different word in said storage means.

3. An arrangement as claimed in claim 2 in which a flip-flop enables an AND-gate long enough to permit a train of clock pulses to drive the counter through one complete cycle.

4. An arrangement as claimed in claim 2 in which flip-flop enables an AND-gate long enough for a first clock pulse to start the counter on its cycle, the counter then enabling the same or another AND-gate to permit further clock pulses to drive the counter to the end of its cycle.

5. An arrangement as claimed in claim 3 in which the output circuit is an isolating output circuit.

6. In a telegraph communication system, a waveform generating arrangement comprising in combination:

a source of square-wave transitions between mark and space input signals;

enabling means coupled to said source to be activated by said transitions;

an AND-gate having one input connected to clock pulses and another input coupled to said enabling means;

a cyclic counter activated by said AND-gate so that a train of clock pulses drives said counter through one complete cycle;

a digital storage means containing a plurality of words arranged to be serially read out by bit, and each count step in said cyclic counter accessing a different word in said storage means, said plurality of words providing a pulse-width modulated pulse train representing a predetermined profile of said transitions between mark and space input signals; and switching means coupled to said storage means and said source, said switching means being under control of said transitions between mark and space input signals to apply the output of said storage means in the form of said pulse-width modulated pulse train representing said predetermined profile to an output circuit, and said output circuit including a smoothing circuit which demodulates said pulse-width modulated pulse train so that the output of said output circuit contains transitions with said predetermined profile.

* * * * *